United States Patent
Weber et al.

(10) Patent No.: US 8,156,926 B2
(45) Date of Patent: Apr. 17, 2012

(54) SYSTEMS AND METHODS FOR FILTERING CRANKCASE FUMES

(75) Inventors: James Richard Weber, Lacon, IL (US); Justin Werner McMenamy, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 701 days.

(21) Appl. No.: 12/219,818

(22) Filed: Jul. 29, 2008

(65) Prior Publication Data

US 2010/0024788 A1    Feb. 4, 2010

(51) Int. Cl.
*F02M 25/06* (2006.01)
(52) U.S. Cl. .......................................... 123/572
(58) Field of Classification Search .......... 123/572–574, 123/41.86
See application file for complete search history.

(56) References Cited

U.S. PATENT DOCUMENTS

| | | | |
|---|---|---|---|
| 4,300,511 A | 11/1981 | Lang | |
| 4,569,323 A | 2/1986 | Okumura | |
| 4,602,595 A * | 7/1986 | Aoki et al. | 123/41.86 |
| 4,607,604 A * | 8/1986 | Kanoh et al. | 123/572 |
| 4,723,529 A * | 2/1988 | Yokoi et al. | 123/573 |
| 5,285,754 A | 2/1994 | Bell | |
| 5,927,258 A | 7/1999 | Clauss et al. | |
| 6,152,120 A * | 11/2000 | Julazadeh | 123/572 |
| 6,247,463 B1 * | 6/2001 | Fedorowicz et al. | 123/572 |
| 6,263,847 B1 * | 7/2001 | Hoffmann et al. | 123/90.39 |
| 6,354,283 B1 | 3/2002 | Hawkins et al. | |
| 6,412,478 B1 | 7/2002 | Ruehlow et al. | |
| 6,435,170 B1 | 8/2002 | Hamelink et al. | |
| 6,478,018 B2 | 11/2002 | Fedorowicz et al. | |
| 6,478,019 B2 | 11/2002 | Fedorowicz et al. | |
| 6,561,171 B2 | 5/2003 | Burgess | |
| 6,725,849 B2 | 4/2004 | Stegmaier et al. | |
| 6,837,914 B2 | 1/2005 | Baek | |
| 7,238,216 B2 | 7/2007 | Malgorn et al. | |
| 7,243,642 B2 * | 7/2007 | Nishikawa et al. | 123/572 |

* cited by examiner

*Primary Examiner* — M. McMahon
(74) *Attorney, Agent, or Firm* — Finnegan, Henderson, Farabow, Garrett & Dunner LLP

(57) ABSTRACT

A filtration system is disclosed. The filtration system includes a valve lid defining a chamber. The chamber is configured to extend substantially in a second direction. The filtration system also includes a filter element associated with a lower portion of the chamber. The filtration system further includes a passageway in flow communication with the lower portion of the chamber. The passageway is configured to provide flow communication for a mixture of oil vapor and crankcase fumes flowing into the chamber substantially in a first direction and substantially upward direction. The first direction is generally orthogonal to the second direction. The chamber is configured such that the flow of the mixture into the chamber results in at least a portion of the oil vapor collecting in the filter element, and at least a portion of the crankcase fumes flowing through the filter element.

25 Claims, 3 Drawing Sheets

SYSTEMS AND METHODS FOR FILTERING CRANKCASE FUMES

TECHNICAL FIELD

This disclosure is directed to systems and methods for filtering crankcase fumes, and more particularly, to systems and methods for separating oil vapor from crankcase fumes for an internal combustion engine.

BACKGROUND

An internal combustion engine, such as, for example, a compression ignition engine, spark ignition engine, or natural gas engine, may include a cylinder block defining at least one cylinder housing a reciprocating piston. The internal combustion engine may further include a crankshaft operably coupled to the piston, such that reciprocation of the piston within the cylinder serves to rotate the crankshaft. The crankshaft may be housed within a crankcase defined, for example, by a lower portion of the cylinder block and an oil pan. The crankcase may be adequately sealed from the surrounding atmosphere to prevent vapor from the engine from being expelled directly into the environment.

During an engine's operation, gases related to the combustion process may collect in the crankcase. Such gases may include, for example, oil mist particles and crankcase fumes (e.g., soot from combustion, unburned fuel, exhaust gases, and/or water vapor). These gases may contribute to pressure build-up within the crankcase, which may be undesirable for a number of reasons. In order to relieve this pressure build-up, the engine may include a crankcase ventilation system configured to vent a portion of these gases to the environment. In order to prevent venting of certain portions of the gases, the crankcase ventilation system may also serve to filter and retain oil mist particles. The retained oil mist particles may be collected and may be returned to the engine's lubrication system for reuse.

For example, U.S. Pat. No. 6,561,171 issued to Burgess on May 13, 2003 ("the '171 patent"), discloses a crankcase emission control system that includes a pair of filter elements for filtering oil from crankcase emissions. The system in the '171 patent also includes a sump and check valve system for returning the filtered oil to an engine. In the system of the '171 patent, crankcase emissions flow across the pair of filter elements in a horizontal direction. The '171 patent discloses that the sump collects oil coalescing on the downstream surface of the second filter and the collected oil is drained to the engine when the engine is idle or shut down.

Although the system disclosed in the '171 patent purportedly provides separation of oil from crankcase emissions, it requires the engine to be shut down or be in an idle state in order to drain oil back to the engine.

The systems and methods of the present disclosure may be directed towards improvements in the existing technology.

SUMMARY

In one aspect, the present disclosure is directed to a filtration system. The filtration system may include a valve lid defining a chamber. The chamber may be configured to extend substantially in a second direction. The filtration system may also include a filter element associated with a lower portion of the chamber. The filtration system may further include a passageway in flow communication with the lower portion of the chamber. The passageway may be configured to provide flow communication for a mixture of oil vapor and crankcase fumes flowing into the chamber substantially in a first direction and substantially upward direction. The first direction may be generally orthogonal to the second direction. The chamber may be configured such that the flow of the mixture into the chamber results in at least a portion of the oil vapor collecting in the filter element, and at least a portion of the crankcase fumes flowing through the filter element.

In another aspect, the present disclosure is directed to a method of separating oil vapor from crankcase fumes. The method may include flowing a mixture of oil vapor and crankcase fumes substantially in a first direction and substantially upward direction. The method may also include flowing the mixture into a chamber, wherein the chamber at least partially extends substantially in a second direction. The second direction may be generally orthogonal to the first direction. The method may further include flowing the mixture into the chamber such that at least a portion of the crankcase fumes flows through a filter element associated with the chamber, and at least a portion of the oil vapor collects in the filter element.

In yet another aspect, the present disclosure is directed to a filter element. The filter element may include a filter material, the filter material being substantially planar and being configured to correspond to a configuration of a valve cover.

DETAILED DESCRIPTION

Figure 1:
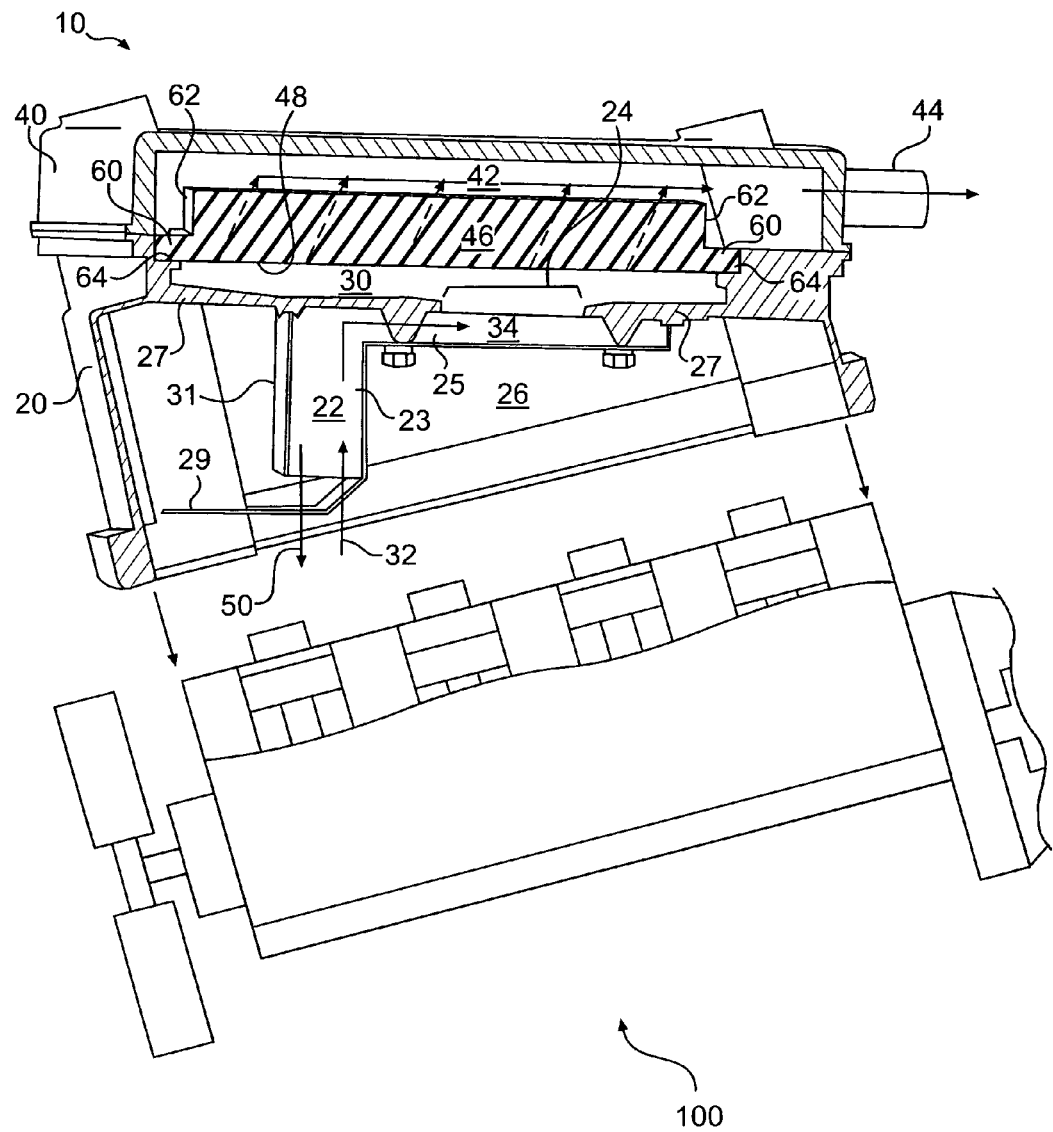
FIG. 1 is a schematic, cross-sectional view of an exemplary embodiment of a crankcase fumes filtration system.

An exemplary embodiment of a filtration system 10 for filtering crankcase fumes is schematically illustrated in FIG. 1. Filtration system 10 may be used, for example, to separate oil vapor from crankcase fumes, which may include soot, unburned fuel, exhaust fumes, and/or water vapor, during operation of an internal combustion engine 100.

As shown in FIG. 1, exemplary filtration system 10 may include a valve cover 20, a filter element 46, and a valve lid 40. For example, valve cover 20 may define a cavity 26. Cavity 26 may include an upper portion 30 defined by a barrier 27 defining an opening 24 providing flow communication between a lower portion of cavity 26 and upper portion 30. Upper portion 30 may extend at least partially in a (e.g., horizontal) direction. Similarly, cavity 26 may extend at least partially (e.g., horizontally). Valve lid 40 may define a chamber 42, and filter element 46 may be located between valve cover 20 and valve lid 40, such that filter element 46 is positioned between chamber 42 of valve lid 40 and upper portion 30 of cavity 26 of valve cover 20.

Filtration system 10 may further include a breather element 34 operably coupled to a lower portion of valve cover 20, such that a passageway 22 is defined to provide flow communication between a portion of an engine below valve cover 20 and upper portion 30 of cavity 26 via opening 24 in barrier 27. For example, passageway 22 may define a vertical portion 23 leading to a horizontal portion 25. A wall member 31 may be coupled to barrier 27, such that wall member 31 may help to define vertical portion 23. Wall member 31 may be generally planar and may be generally rectangular in shape. A mixture 32, for example, including crankcase fumes and/or oil vapor, may flow into passageway 22 in a first direction at vertical portion 23 and in a second direction in horizontal portion 25. The second direction may be generally orthogonal to the first direction. As shown in FIG. 1, the first direction may be a substantially vertical direction and the second direction may be a substantially horizontal direction. Mixture 32 may then flow into upper portion 30 of cavity 26 via opening 24 in barrier 27, such that mixture 32 is exposed to substantially an entire lower surface 48 of filter element 46. Passageway 22 may be generally rectangular and/or cylindrical in shape, or any combination of appropriate shapes.

According to some embodiments, breather element 34 may be formed from any appropriate breather material, such that a portion of any oil vapor included within mixture 32 (e.g., crankcase fumes, etc.) may be separated from mixture 32. For example, breather element 34 may include one or more ears 29 for coupling breather element 34 inside valve cover 20. Breather element 34 may define a cross-section (not shown) that may be in the form of a mesh or a web. According to some embodiments, the cross-section of breather element 34 may be configured to prevent individual oil vapor droplets of a first average size, e.g., an average of the sizes of the individual oil vapor droplets, from flowing through breather element 34 and flowing into upper portion 30 of cavity 26 via opening 24. The individual oil vapor droplets that may be prevented from flowing into upper portion 30 of cavity 26 may be collected (e.g., coalesced) in breather element 34. The collected oil vapor may thereafter flow from breather element 34 and down into passageway 22. While breather element 34 may be shown to be located in horizontal portion 25, it is contemplated that breather element 34 may be located at any point within passage 22. For example, breather element may be located in vertical portion 23. According to some embodiments, breather element 34 may be generally planar and may be generally planar in shape. However, breather element 34 may assume any appropriate shapes.

According to some embodiments, as shown in FIG. 1, valve lid 40 may include an outlet 44 in flow communication with chamber 42. For example, chamber 42 may extend in a (e.g., substantially horizontal) direction, and filter element 46 may be associated with a lower portion of chamber 42. In such an exemplary configuration, filter element 46 may be located upstream of upper portion 30 of cavity 26.

For example, mixture 32 may flow from upper portion 30 of cavity 26 through filter element 46 and into chamber 42. Filter element 46 may be formed from any appropriate filter material, for example, such that at least a portion of oil vapor may be separated from mixture 32 upon flowing into and/or through filter element 46. Filter element 46 may include a cross-section (not shown) that may be in the form of a mesh or a web. For example, the cross-section of filter element 46 may be configured to substantially prevent individual oil vapor droplets of a second average size (e.g., distinct from the first average size associated with breather element 34) from flowing through filter element 46 and flowing into chamber 42. According to some embodiments, filter element 46 may be formed from a finer material as compared to breather element 34. For example, the average size of the individual oil vapor droplets that may be collected in breather element 34 may be greater than the average size of the individual oil vapor droplets that may be collected in filter element 46 (i.e., the first average size may be greater than the second average size). Alternatively, it is contemplated that the first average size may be less than or equal to the second average size. The individual oil vapor droplets that may be prevented from flowing into chamber 42 may be collected (e.g., coalesced) in filter element 46. The collected oil vapor may flow from filter element 46 and down into passageway 22.

According to some embodiments, for example, as shown in FIG. 1, mixture 32 flows via passageway 22 and opening 24 into upper portion 30 of cavity 26. As mixture 32 enters upper portion 30, mixture 32 may disperse (e.g., horizontally) into a volume defined by upper portion 30. As the (e.g., vertical) component of the velocity of the flow of mixture 32 drops, the (e.g., vertical) momentum of, for example, oil vapor droplets in mixture 32 also decreases. At least a portion of the oil vapor droplets (e.g., a portion of relatively larger oil vapor droplets) precipitates out of mixture 32 as a result of the gravitational force acting on the oil vapor droplets. For example, a first portion of mixture 32 may not flow through filter element 46, when the gravitational force overcomes the (e.g., vertical) momentum of the first portion of mixture 32. This first portion of mixture 32 may be collected in upper portion 30 of cavity 26, where it may then flow down into passageway 22. In contrast, a second portion of mixture 32 may flow into and/or through filter element 46, for example, when the gravitational force is not sufficient to overcome the (e.g., vertical) momentum the second portion of mixture 32. All, or at least most, oil vapor droplets included in the second portion of mixture 32 may be collected in filter element 46, such that a third portion of mixture 32 that is substantially free of oil vapor droplets passes through filter element 46 and into chamber 42 and exits valve lid 40 via, for example, outlet 44.

According to some embodiments, oil vapor droplets collected in breather element 34 (and/or filter element 46) and/or any oil vapor droplets that may not have passed through breather element 34 (and/or filter element 46) may be returned to the engine's lubrication system (e.g., via the engine's crankcase). For example, such collected oil vapor droplets may flow down into passageway 22, into vertical portion 23, forming a stream 50, which may flow in a first direction and substantially downward direction. The first direction may be a substantially vertical direction.

Figure 2:
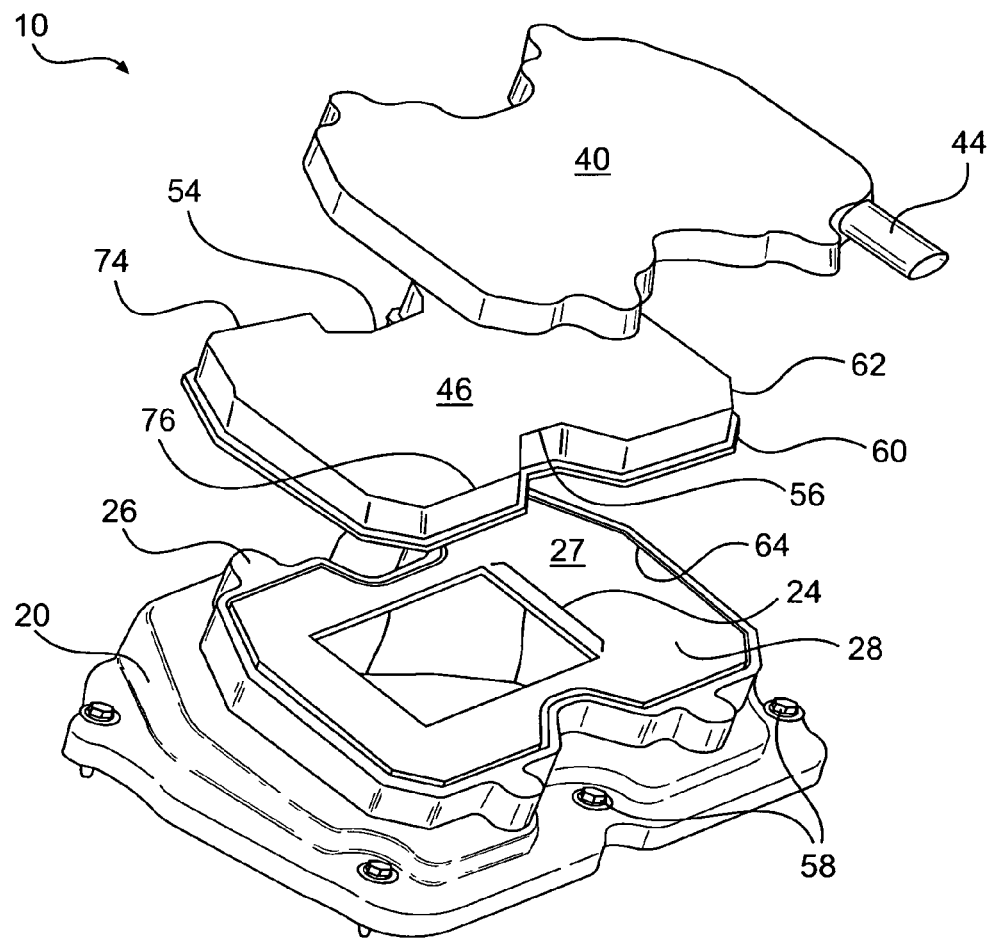
FIG. 2 is a schematic, exploded view of an exemplary embodiment of a crankcase fumes filtration system.
Figure 2:
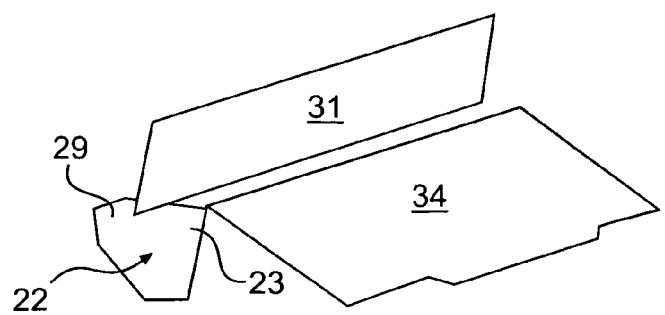

Referring to FIG. 2, some embodiments of filtration system 10 may include valve cover 20 with opening 24 that is generally rectangular in shape (as shown), generally circular in shape, or any other appropriate shape. Barrier 27 may define a top surface 28 and opening 24 may define an area less than an area defined by barrier 27 and/or top surface 28, such that a portion of cavity 26 may be partially enclosed by barrier 27. Alternatively, it is contemplated that opening 24 may define an area substantially the same size as the area defined by barrier 27 and/or top surface 28, such that cavity 26 opens up into upper portion 30.

Filter element 46 may be configured to correspond to a configuration of valve lid 40 and/or valve cover 20, such that filter element 46 may be located between valve lid 40 and valve cover 20. According to some embodiments, filter element 46 may include a first recess 54 and/or a second recess 56, as shown in FIG. 2. For example, filter element 46 may include side edges 74 and 76. First recess 54 may be located along side edge 74, and second recess 56 may be located along side edge 76. Side edge 74 may be substantially opposite from side edge 76 with respect to filter element 46. Similarly, first recess 54 may be substantially opposite from second recess 56 with respect to filter element 46. First recess 54 and/or second recess 56 may be configured to provide clearance for one or more fastening members 58 that may serve to operably couple valve cover 20 to an upper portion of an engine (not shown). For example, as shown in FIG. 2, fastening member(s) 58 may be a bolt. Alternatively, fastening member(s) 58 may be a screw, a rivet, a pin, and/or any appropriate fastener for operably coupling valve cover 20 to an internal combustion engine (not shown). As shown in FIG. 2, first and second recesses 54 and 56 may be central recesses, such that first and second recesses 54 and 56 may be located centrally along side edges 74 and 76. However, it is contemplated that first and second recesses 54 and 56 may be located any where along side edges 74 and 76.

As shown in FIG. 2, exemplary filter element 46 may include a flange 60 extending from, for example, a lower portion of an outer edge 62 of filter element 46. Flange 60 may correspond to and be configured to be received in a recess 64 defined by valve cover 20 and/or valve lid 40 (see, e.g., FIG. 1). Flange 60 may sealingly engage recess 64 (e.g., such that substantially no gap exists between the interface between flange 60 and recess). According to some embodiments, outer edge 62 of filter element 46 may be substantially the same size as an inner dimension of valve lid 40, and outer edge 62 may sealingly engage the inner surface of valve lid 40 (e.g., such that substantially no gap exists between the interface of outer edge 62 and an inner surface of valve lid 40).

Figure 3:
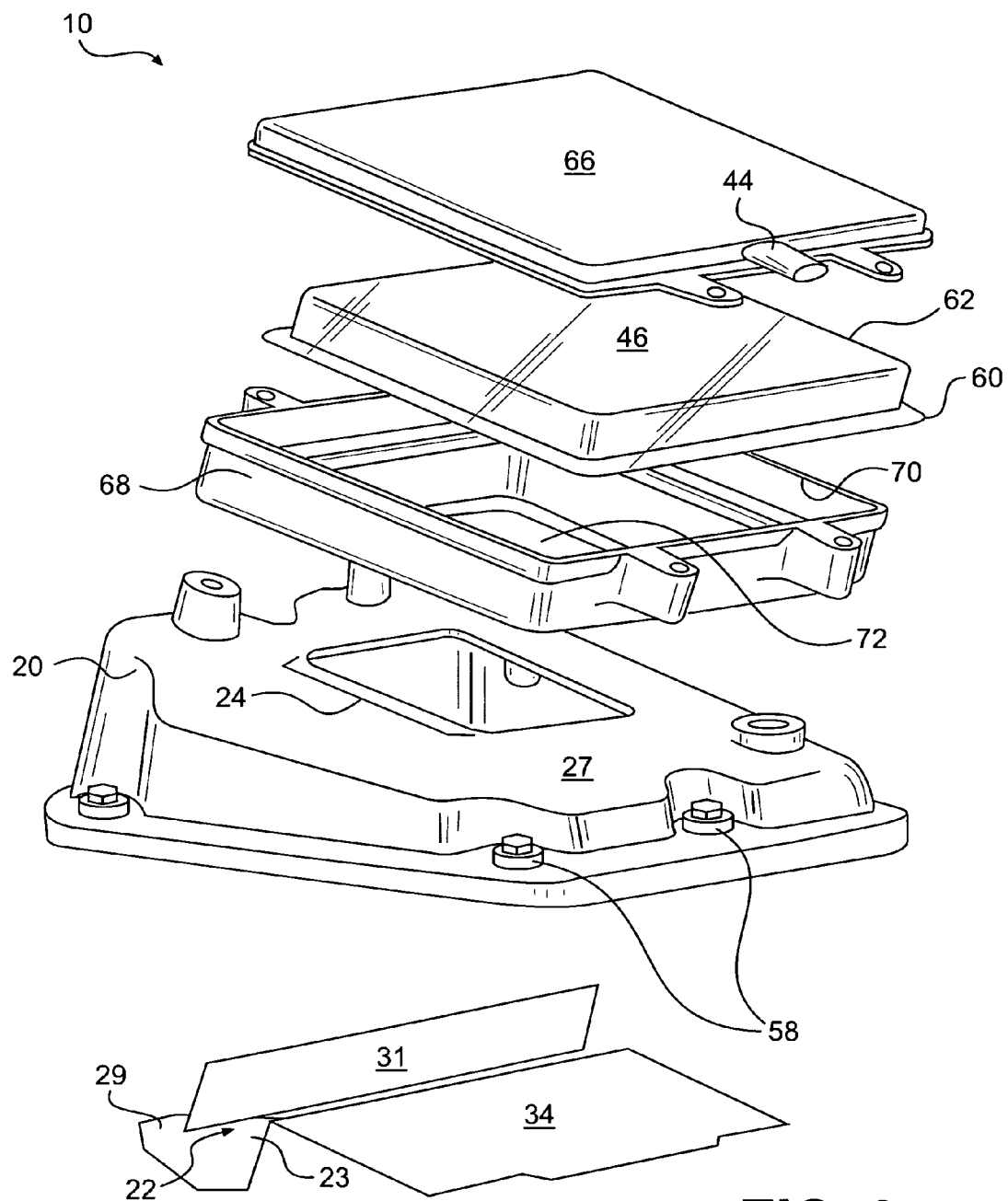
FIG. 3 is a schematic, exploded view a further exemplary embodiment of a crankcase fumes filtration system.

According to some embodiments, for example, as shown in FIG. 3, valve lid 40 may include a top member 66 and a bottom member 68, which when assembled, may define a compartment for receiving filter element 46, such that filter element 46 is located in between top member 66 and bottom member 68. For example, flange 60 of filter element 46 may define outer edge 62 that substantially corresponds to an inner surface 70 of exemplary bottom member 68. Flange 60 may sealingly engage inner surface 70 (e.g., such that substantially no gap exists between the interface of flange 60 and inner surface 70. Similarly, outer edge 62 of filter element 46 may be substantially the same size as an inner dimension of top member 66, and outer edge 62 may sealingly engage an inner surface of top member 66 (e.g., such that substantially no gap exists between the interface of outer edge 62 and an inner surface of top member 66). According to some embodiments, flange 60 and/or outer edge 62 may extend substantially entirely around a periphery (e.g., perimeter) of filter element 46. For example, a sealing engagement between flange 60 of filter element 46 and inner surface 70 of bottom member 68 may define an enclosure. In some embodiments, bottom member 68 may include an opening 72, for example, corresponding to opening 24 in valve cover 20. During exemplary operation, a portion of mixture 32 that may have passed through and/or around breather element 34, may flow into an enclosure defined by filter element 46 and bottom member 68 via opening 72. It is contemplated that opening 72 may be similar in size and in shape as opening 24. Alternatively, opening 72 may be of different size and/or shape as compared to opening 24.

For purpose of this disclosure, it is intended that directional terms such as vertical, horizontal, etc. are in reference to a top surface of valve lid 40. For example, when a component is referred to as being substantially vertical, the component may be substantially orthogonal with respect to the top surface of valve lid 40. Alternatively, when a component is referred to as being substantially horizontal, the component may be substantially parallel with respect to the top surface of valve lid 40.

Industrial Applicability

The disclosed filtration systems and methods for filtering crankcase fumes may be applicable to any machine, for example, where separation of oil vapor from crankcase fumes may be desirable. Exemplary operation of different embodiments of filtration system 10 will now be discussed.

Exemplary filtration systems and methods may help to implement a method of separating oil vapor from crankcase fumes. Filtration system 10 may be used with internal combustion engine 100. For example, as shown in FIG. 1, filtration system 10 may include passageway 22 that may extend (e.g., substantially vertically) to provide flow communication with cavity 26 defined by valve cover 20 and filter element 46, such that mixture 32 may flow in a first direction (e.g., substantially vertical) and substantial upward direction through passageway 22. Mixture 32 may include a mixture of oil vapor and crankcase fumes (e.g., soot, unburned fuel, exhaust fumes, and/or water vapor). Breather element 34 may be located upstream of opening 24 (e.g., at any location within passageway 22), such that a portion of oil vapor in mixture 32 may not flow into upper portion 30 of cavity 26 via opening 24. The portion of oil vapor that may not have pass into upper portion 30 may instead collect in breather element 34. By locating breather element 34 upstream of opening 24, thereby collecting oil vapor on an upstream side of breather element 34, filtration system 10 may help to reduce or eliminate the need for pressurization of the collected oil vapor if the oil vapor were to be collected on a downstream side of breather element 34. By eliminating the need for pressurization of collected oil vapor (as may be required for at least some conventional systems), filtration system 10 may include fewer components. For example, filtration system 10 may not include a sump and a check valve for returning the collected oil vapor to the an engine equipped with filtration system 10. This reduction in the number of components included in filtration system 10 may help to reduce the cost and/or difficulty associated with manufacturing filtration system 10. The reduction in number of components included in filtration system 10 may also help to reduce the amount of space required for filtration system 10.

Filtration system 10 may include filter element 46 that may be located in between upper portion 30 of cavity 26 and chamber 42. For example, filter element 46 may be located upstream of upper portion 30, and a portion of oil vapor in mixture 32 that may have passed into upper portion 30 may not necessarily flow into chamber 42. The portion of oil vapor that may not have passed into chamber 42 may instead collect in filter element 46. As discussed above with respect to breather element 34, by locating filter element 46 upstream of upper portion 30, filtration system 10 may help to reduce or eliminate the need for pressurization of the collected oil vapor, as compared to collecting oil vapor on a downstream side of filter element 46. Collecting oil vapor on the upstream side of filter element 46 may also help to reduce the number of components included in filtration system 10.

According to some embodiments, filter element 46 may be configured to correspond to a configuration of valve lid 40 and/or valve cover 20, such that filter element 46 may be located between valve lid 40 and valve cover 20. For example, a perimeter of filter element 46 may correspond to a perimeter of valve lid 40 and/or valve cover 20. In such instances, a surface area of lower surface 48 of filter element 46 may be maximized, such that a major portion of mixture 32 that may be present in upper portion 30 of cavity 26 may contact lower surface 48, and the component (e.g., a vertical component) of the velocity of the flow of mixture 32 may drop.

According to some embodiments, filter element 46 may be formed from a finer material than breather element 34. For example, the average size of the individual oil vapor droplets that may be collected in breather element 34 may be greater than the average size of the individual oil vapor droplets that may be collected in filter element 46. The ability of filter element 46 and breather element 34 to collect oil vapor droplets of different average sizes, and/or to prevent oil vapor droplets of different average sizes from flowing through filter element 46 and breather element 34, may help to ensure that substantially all oil vapor is returned to the engine's lubrication system.

Because vertical portion 23 of passageway 22 may extend (e.g., vertically) to provide flow communication with cavity 26, passageway 22 may help to facilitate the return of the oil vapor collected in filter element 46 and/or breather element 34 to the engine's lubrication system. For example, oil vapor collected in breather element 34 may flow from breather element 34 and into passageway 22 in a first direction (e.g., substantially vertical) and substantially downward direction, due to gravity. Similarly, oil vapor collected in filter element 46 may flow from filter element 46 into passageway 22 in a first direction (e.g., substantially vertical) and substantially downward direction, also due to gravity. Extending passageway 22 at least partially in a first direction (e.g., substantially vertical) may also help to facilitate the flow of mixture 32 in a first direction (e.g., substantially vertical) and upward direction. Flowing mixture 32 in such way may help to facilitate separating oil vapor from mixture 32.

For example, as shown in FIG. 1, mixture 32 flows via passageway 22 and opening 24 into upper portion 30 of cavity 26. As mixture 32 enters upper portion 30, mixture 32 may disperse (e.g., horizontally) into a volume defined by upper portion 30. As the (e.g., vertical) component of the velocity of the flow of mixture 32 drops, the (e.g., vertical) momentum of, for example, oil vapor droplets in mixture 32 also decreases. At least a portion of the oil vapor droplets (e.g., a portion of relatively larger oil vapor droplets) may precipitate out of mixture 32 as a result of the gravitational force acting on the oil vapor droplets. For example, a first portion of mixture 32 may not flow through filter element 46, when the gravitational force overcomes the (e.g., vertical) momentum of the first portion of mixture 32. This first portion of mixture 32 may be collected in upper portion 30 of cavity 26, where the first portion of mixture 32 may then flow down into passageway 22. In contrast, a second portion of mixture 32 may flow into and/or through filter element 46, for example, when the gravitational force is not sufficient to overcome the (e.g., vertical) momentum of the second portion of mixture 32. All, or at least most, oil vapor droplets included in the second portion of mixture 32 may be collected in filter element 46, such that a third portion of mixture 32 that is substantially free of oil vapor droplets passes through filter element 46 and into chamber 42 and exits valve lid 40 via, for example, outlet 44.

In some embodiments, for example, as shown in FIG. 2, filter element 46 may include a first recess 54 and/or a second recess 56, configured to provide clearance for one or more fastening member(s) 58 (e.g., such that filter element 46 may not interfere with the installation of fastening member(s) 58 to secure valve cover 20 to an engine to be equipped with filtration system 10). For example, first recess 54 may be located substantially opposite to second recess 56. First and/or second recesses 54 and 56 may facilitate the installation of filtration system 10. For example, a person installing filtration system 10 in an engine may assemble valve lid 40, filter element 46, and valve cover 20, before installing the assembled filtration system 10 onto the engine, if desired. In some embodiments, however, filter element 46 may not include first and/or second recesses 54 and 56. For those embodiments, a person may secure valve cover 20 onto the engine before assembling, for example, top member 66 (see, e.g., FIG. 3), filter element 46, and bottom member 68.

It will be apparent to those skilled in the art that various modifications and variations may be made to the exemplary systems and methods for filtering crankcase fumes of the present disclosure without departing from the scope of the disclosure. Other embodiments will be apparent to those skilled in the art from consideration of the specification and practice of the systems and methods for filtering crankcase fumes disclosed herein. It is intended that the specification and examples be considered as exemplary only, with a true scope of the disclosure being indicated by the following claims.

What is claimed is:

1. A filtration system, comprising:
   a valve lid defining a chamber, the chamber being configured to extend substantially in a second direction;
   a filter element associated with a lower portion of the chamber;
   a passageway in flow communication with the lower portion of the chamber,
   wherein the passageway is configured to provide flow communication for a mixture of oil vapor and crankcase fumes flowing into the chamber substantially in a first direction and substantially upward direction, the first direction being generally orthogonal to the second direction;
   a valve cover in flow communication with the valve lid, the valve cover forming a cavity and an opening of the passageway, the passageway fluidly connecting the cavity and the filter element; and
   a breather element disposed within the passageway upstream of the opening; and
   wherein the chamber is configured such that the flow of the mixture into the chamber results in at least a portion of the oil vapor collecting in the filter element, and at least a portion of the crankcase fumes flowing through the filter element.

2. The system of claim 1, wherein the breather element includes an ear coupling the breather element inside the valve cover.

3. The system of claim 1, wherein the filter element being located in between the valve lid and the valve cover.

4. The system of claim 1, wherein the valve lid includes a top member; and a bottom member defining an opening, wherein the to member and the bottom member substantially enclose the filter element.

5. The system of claim 1, wherein the filter element defines a recess, the recess being configured to provide clearance for a fastening member configured to operably couple the system to an engine.

6. The system of claim 1, wherein the passageway is configured to provide flow communication between the chamber and an engine in the first direction and substantially downward direction.

7. The system of claim 2, wherein the filter element defines a flange, and the flange of the filter element being configured to correspond to a recess of the cavity.

8. The system of claim 3, wherein the filter element defines an outer edge, and the outer edge of the filter element being configured to correspond to an inner surface of the valve lid.

9. The system of claim 1, wherein the passageway directs the mixture through the opening in substantially the same direction as a direction of flow of the mixture through the filter element.

10. The system of claim 1, wherein the mixture passes through the opening and the filter element in the substantially upward direction.

11. The system of claim 1, wherein the passageway directs the mixture through the breather element in the second direction.

12. The system of claim 1, wherein the breather element collects a first portion of the oil vapor and the at least a portion of the oil vapor collected in the filter element comprises a second portion of the oil vapor, the second portion of the oil vapor passing from the breather element to the filter element without further treatment.

13. A filtration system, comprising:
   a valve lid defining a chamber, the chamber being configured to extend substantially in a second direction, the valve lid including a top member and a bottom member defining an opening;
   a filter element associated with a lower portion of the chamber, wherein the top member and the bottom member of the valve lid substantially enclose the filter element; and
   a passageway in flow communication with the lower portion of the chamber,
   wherein the passageway is configured to provide flow communication for a mixture of oil vapor and crankcase fumes flowing into the chamber and through the filter element substantially in a first direction and substantially upward direction, the first direction being generally orthogonal to the second direction, and
   wherein the chamber is configured such that the flow of the mixture into the chamber results in at least a portion of the oil vapor collecting in the filter element, and at least a portion of the crankcase fumes flowing through the filter element.

14. The system of claim 13, wherein the filter element being located in between the valve lid and the valve cover.

15. The system of claim 13, wherein the filter element defines a recess, the recess being configured to provide clearance for a fastening member configured to operably couple the system to an engine.

16. The system of claim 13, wherein the passageway is configured to provide flow communication between the chamber and an engine in the first direction.

17. The system of claim 13, wherein the filter element defines a flange, and the flange of the filter element being configured to correspond to a recess of a cavity fluidly connected to the chamber.

18. The system of claim 14, wherein the filter element defines an outer edge, and the outer edge of the filter element being configured to correspond to an inner surface of the valve lid.

19. A filtration system, comprising:
   a valve lid configured to extend substantially horizontally above a crankcase of an internal combustion engine, the valve lid defining a chamber extending along a length of the valve lid;
   a filter element extending substantially horizontally within the chamber; and
   a valve cover connected to the valve lid and defining a passageway,
      the passageway forming a first portion extending substantially perpendicular to the filter element, and a second portion extending substantially parallel to the filter element, the second portion defining an opening fluidly connecting the crankcase with the chamber;
   wherein the passageway is configured to direct a mixture of oil vapor and crankcase fumes flowing from the crankcase into the chamber, at least a portion of the oil vapor collecting in the passageway and a remainder of the oil vapor collecting in the filter element as the mixture moves upwardly and in a direction away from the crankcase.

20. The system of claim 19, wherein the filter element being located in between the valve lid and the valve cover.

21. The system of claim 19, wherein the valve lid includes a top member; and a bottom member defining an opening, wherein the top member and the bottom member substantially enclose the filter element.

22. The system of claim 19, wherein the filter element defines a recess, the recess being configured to provide clearance for a fastening member configured to operably couple the system to the engine.

23. The system of claim 19, wherein the passageway is configured to provide flow communication between the chamber and the engine in a substantially upward direction.

24. The system of claim 19, wherein the filter element defines a flange, and the flange of the filter element being configured to correspond to a recess of a cavity formed by the valve cover.

25. The system of claim 20, wherein the filter element defines an outer edge, and the outer edge of the filter element being configured to correspond to an inner surface of the valve lid.

* * * * *